United States Patent
Benner et al.

(10) Patent No.: US 9,624,318 B2
(45) Date of Patent: Apr. 18, 2017

(54) MATTING AGENT FOR UV VARNISHES

(75) Inventors: Klaus Benner, Bornheim (DE); Hans-Dieter Christian, Ueberlingen (DE); Gottlieb Lindner, Bonn (DE); Karl Meier, Alfter (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/498,343

(22) PCT Filed: Aug. 20, 2010

(86) PCT No.: PCT/EP2010/062171
§ 371 (c)(1),
(2), (4) Date: Mar. 27, 2012

(87) PCT Pub. No.: WO2011/038991
PCT Pub. Date: Apr. 7, 2011

(65) Prior Publication Data
US 2012/0202914 A1   Aug. 9, 2012

(30) Foreign Application Priority Data

Sep. 29, 2009 (DE) .................. 10 2009 045 104

(51) Int. Cl.
C08F 2/48 (2006.01)
C08F 2/44 (2006.01)
C01B 33/143 (2006.01)
C01B 33/146 (2006.01)
C01B 33/187 (2006.01)

(52) U.S. Cl.
CPC .............. *C08F 2/48* (2013.01); *C01B 33/143* (2013.01); *C01B 33/146* (2013.01); *C01B 33/187* (2013.01); *C08F 2/44* (2013.01); *C01P 2004/61* (2013.01)

(58) Field of Classification Search
CPC ... C09D 4/00; C09D 5/032; C08F 2/48; C08F 2/44; C08K 3/36
USPC ............ 522/99; 524/588; 427/160; 241/24.1
See application file for complete search history.

(56) References Cited

U.S. PATENT DOCUMENTS

| 4,624,971 | A | 11/1986 | Van Tao et al. |
| 6,191,122 | B1 | 2/2001 | Lux et al. |
| 7,070,749 | B2 | 7/2006 | Lindner et al. |
| 7,097,818 | B2 | 8/2006 | Lindner et al. |
| 7,204,969 | B2 | 4/2007 | Kuhlmann et al. |
| 7,285,330 | B2 | 10/2007 | Meyer et al. |
| 7,303,624 | B2 | 12/2007 | Meyer et al. |
| 7,402,293 | B2 | 7/2008 | Meyer et al. |
| 7,488,382 | B2 | 2/2009 | Schubert et al. |
| 7,816,442 | B2 * | 10/2010 | Christian et al. ............. 524/492 |
| 7,871,588 | B2 | 1/2011 | Lindner et al. |
| 8,007,751 | B2 | 8/2011 | Panz et al. |
| 8,012,253 | B2 | 9/2011 | Schubert et al. |
| 2003/0162881 | A1 | 8/2003 | Panz et al. |
| 2004/0249049 | A1 | 12/2004 | Christian et al. |
| 2005/0192395 | A1 | 9/2005 | Panz et al. |
| 2005/0282935 | A1 | 12/2005 | Christian et al. |
| 2006/0127666 | A1 * | 6/2006 | Fuchs .......................... 428/343 |
| 2006/0251906 | A1 | 11/2006 | Liao et al. |
| 2008/0139756 | A1 | 6/2008 | Christian et al. |
| 2009/0101866 | A1 | 4/2009 | Schubert et al. |

FOREIGN PATENT DOCUMENTS

| DE | 101 38 492 | 2/2003 |
| DE | 10 2004 029 073 | 12/2005 |
| EP | 1 477 457 | 11/2004 |
| JP | 2000-006325 A | 1/2000 |
| JP | 2004-339515 A | 12/2004 |
| JP | 2005-511356 A | 4/2005 |
| JP | 2006-002152 A | 1/2006 |
| WO | WO 03/049942 A1 | 6/2003 |

OTHER PUBLICATIONS

International Search Report Issued Sep. 21, 2010 in PCT/EP10/62171 Filed Aug. 20, 2010.
English translation of the Office Action issued Mar. 10, 2014 in Japanese Patent Application No. 2012-531301.

* cited by examiner

*Primary Examiner* — Michael Pepitone
*Assistant Examiner* — Jessica Roswell
(74) *Attorney, Agent, or Firm* — Oblon, McClelland, Maier & Neustadt, L.L.P.

(57) ABSTRACT

The invention relates to matted UV varnishes comprising silicon dioxide, the surface thereof having been modified by means of treatment with a multiple bond organopolysiloxane so as to be particularly well-suited for use as a matting material for UV varnishes, and to a method for producing same.

17 Claims, No Drawings

MATTING AGENT FOR UV VARNISHES

The invention relates to matted UV coating materials comprising silicon dioxides whose surface has been modified, by treatment with a multiple-bond-containing organopolysiloxane, such that they are particularly suitable for use as matting agents for UV coating materials, and also to a process for producing the coating materials and for preparing the surface-modified silicon dioxides.

The matting of UV coating materials has always constituted a major problem. Unlike other coating systems, there are no instances of contraction during the curing of UV coating materials. As a result, no rough surface can form, and the particles added as matting agents may not display their matting effect.

In an extensive study (see RadTech Europe 2005 Conference and Exhibition), H. D. Christian tested various fumed and precipitated silicas as matting agents in UV coating materials. The silicas tested included untreated silicas, silicas coated with PE wax, and polysiloxane-coated silicas. Christian's conclusions were that the matting of UV coating materials continued to be a complex problem, and that the study had not succeeded in showing which matting agent was the agent of choice for UV coating materials.

Consequently there continues to be a high demand for silicon dioxide-based matting agents developed especially for the matting of UV coating materials.

It was an object of the present invention, therefore, to provide surface-modified silicon dioxides which, in use as matting agents in UV coating materials, especially UV-curing clear coating materials, display better performance properties than the existing silicon dioxide-based matting agents. A process for preparing the surface-modified silicas is also to be provided, as is a process for producing the coating materials.

Further objects, not explicitly stated, will become apparent from the overall context of the description, examples and claims below.

Surprisingly it has been found that the surface modification of silicon dioxides with organopolysiloxanes containing multiple bonds leads to products which are outstandingly suitable as matting agents for UV coating materials, especially UV-curing clear coating materials.

As well as UV coating materials, which are particularly difficult to matt, all other coating systems can also be matted outstandingly using the products of the invention.

On the basis of the new matting agents of the invention, the UV-curing clear coating materials of the invention have the advantage, furthermore, that, particularly in the liquid state, they exhibit improved transparency as compared with UV coating materials matted with a silicon dioxide coated with a PE wax. At the same time, the sedimentation properties of the polysiloxane-modified silicon dioxides are at least as good as those of the silicon dioxides modified with polyethylene wax (PE wax). Accordingly, the silicas used in accordance with the invention, coated with polysiloxanes containing multiple bonds, have advantages over matting agents coated with PE waxes, which frequently cause hazing of the clear coating material.

It has been found that silicon dioxides can be modified, by coating with the organopolysiloxanes containing multiple bonds, in such a way that UV coating materials having a refractive index in the range from 1.4000 to 1.5000, into which the silicon dioxides of the invention have been incorporated, exhibit outstanding transparency. In comparison to UV coating materials which comprise conventional, PE wax-coated silicas as matting agents and have a refractive index in the range from 1.4000 to 1.5000, identical coating materials which comprise the silicas of the invention as matting agents display a sharply improved transparency, in liquid form as well, and the sedimentation properties are outstanding. Clear coating materials matted with conventional matting agents are generally hazy in their liquid form, whereas, even in liquid form, the clear coating materials matted with the precipitation silicas of the invention are largely clear and transparent.

The present invention accordingly provides UV coating materials, preferably UV-curing clear coating materials, comprising at least one surface-modified silicon dioxide which is distinguished by the fact that at least parts of the silicon dioxide particles are coated with at least one organopolysiloxane, and that at least one organopolysiloxane contains at least one multiple bond.

The present invention further provides a process for preparing the surface-modified silicon dioxides used in accordance with the invention, which is characterized in that a dried silicon dioxide or a suspension of a silicon dioxide or a filter cake is contacted with at least one organopolysiloxane which contains at least one multiple bond.

The surface-modified silicon dioxides used in accordance with the invention are preferably amorphous silicon dioxides, more preferably precipitated silicas, fumed silica, semigels or silica gels. The difference between the types of silicon dioxide stated is known to the skilled person and may be looked up, for example, in Ullmann's Encyclopedia of Chemistry, 5th edition, Vol. 23. For reasons of economics and also on the basis of their surface nature, i.e. the number of coupling sites for the polysiloxane, precipitated silicas, semigels and silica gels are particularly preferred. It is especially preferred to use precipitated silicas.

The terms "precipitated silicas" and "precipitation silicas" are used synonymously in the context of the present invention. Also used synonymously are the terms "organopolysiloxane" and "polyorganosiloxane".

The silicon dioxides used in accordance with the invention are preferably characterized by at least one of the following physicochemical parameters:

It has emerged that the DBP number of the silicon dioxides used in accordance with the invention can be correlated to a certain extent with the matting efficiency. Moreover, the DBP number is important in order to ensure an optimum absorption of organopolysiloxane. The DBP number of the silicon dioxides used in accordance with the invention is therefore preferably in the range of 100-600 g/100 g, more preferably 150-500 g/100 g, very preferably 200-450 g/100 g and especially preferably 250-400 g/100 g.

In order to be able to obtain a particularly good matting effect, but at the same time also to allow a coating surface which is not too rough, the average particle size $d_{50}$ of the surface-modified silicon dioxides used in accordance with the invention is preferably in the range of 1-50 µm, more preferably 1-40 µm, particularly preferably 1-30 µm, especially preferably 2-20 µm and very preferably 3-15 µm. The average particle size may be varied according to the film thickness of the coating.

The surface modification affects the settling behaviour of the surface-modified silicon dioxides used in accordance with the invention. It has emerged that it is particularly advantageous if the carbon content of the surface-modified silicon dioxides used in accordance with the invention is the range of 1%-20% by weight, more preferably 1%-10% by weight and very preferably 2%-8% by weight.

Surface-modifying organopolysiloxanes used are organopolysiloxanes containing multiple bonds, preferably organopolysiloxanes containing at least one carbon-carbon double bond and/or triple bond. Without being tied to any particular theory, the inventors are of the view that the multiple bonds are crosslinked as well in the course of UV curing, and this has beneficial consequences for the matting effect.

It is particularly preferred to use silicone polyether acrylate polymers or silicone polyether methacrylate polymers. Very particular preference is given to using acrylic esters and/or methacrylic esters of hydroxy-functional silanes and/or of polyalkylene-modified siloxanes. More particular preference is given to using organopolysiloxanes which are obtained by esterifying or transesterifying acrylic acid and/or methacrylic acid or acrylic esters and/or methacrylic esters, in the presence of an enzyme that catalyses the esterification or transesterification, with hydroxy-functional and/or polyoxyalkylene-modified siloxane derivatives of the general formula (I)

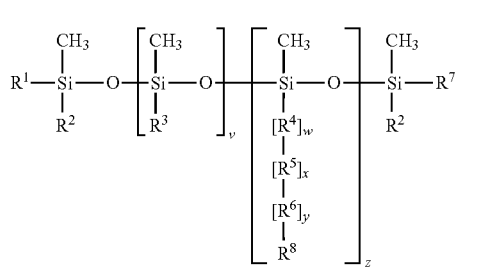

where
$R^1$ and/or $R^7=R^2$ or $[R^4]_w$—$[R^5]_x$—$[R^6]_y$—$R^8$,
$R^2=R^3$ or $\neq R^3$ stands for identical or different alkyl radicals or alkylene radicals having 1 to 24 carbon atoms or optionally substituted phenyl radicals having up to 24 carbon atoms,
$R^4$=a divalent radical of the formula O, NH, $NR^2$, S or a radical of the formula $(OSi(CH_3)_2)_u$, where
u=1 to 200,
$R^5$=identical or different alkyl radicals or alkylene radicals having 1 to 24 carbon atoms, or
$C_nH_{2n-f}R_f^2$—$R^4$—$C_mH_{2n-g}R_g^2$, where
f=0 to 12,
g=0 to 12,
n=1 to 18,
m=1 to 18,
$R^6=O$—$(C_2H_{4-a}R_a^2O)_b(C_cH_{2c}O)_d$, where
a=0 to 3,
b=0 to 100,
c=2 to 12,
d=0 to 100,
the sum (b+d)=1 to 200,
and the sequence of the individual polyoxyalkylene segments $(C_2H_{4-a}R_a^2O)_b$ and $(C_cH_{2c}O)_d$ may be arbitrary, and includes, in particular, block copolymers, such as random polymers and also combinations thereof, or
$R^6=O_e$—$C_hH_{2h}$—$C_iH_{2i-j}R_j^9$, where
e=0 or 1,
h=0 to 24,
i=0 to 24,
j=1 to 3,
the sum (w+e)=0 to 1,
and $R^9$ in each case is a divalent radical of the formula O, a hydroxyl group, a radical of the formula $C_hH_{2h}$ or a radical of the formula $C_kH_{2k-l}(OH)_l$, where
k=0 to 24 and
l=1 to 3,
$R^8$=a hydrogen radical or a monovalent organic radical, if y is 1, it being necessary for there to be at least one hydrogen radical per molecule, or is an OH group or a monovalent organic radical, with y=0, there being at least one OH group per molecule,
v=0 to 200,
w=0 or 1,
x=0 or 1,
y=0 or 1,
z=0 to 200,
and the sum (w+x+y)=1 to 3,
and, if z=0, $R^1$ and/or $R^7$ are
$[R^4]_w$—$[R^5]_x$—$[R^6]_y$—$R^8$
and if x=0, then also w=0.

The skilled person is aware that the compounds are present in the form of a mixture having a distribution which is governed substantially by laws of statistics. In particular, therefore, the values of the indices b, d, u, v and z represent average values.

Examples of siloxane derivatives which can be reacted in accordance with the invention by enzymatically catalysed esterification or transesterification of acrylic and/or methacrylic acid or acrylic and/or methacrylic esters are:

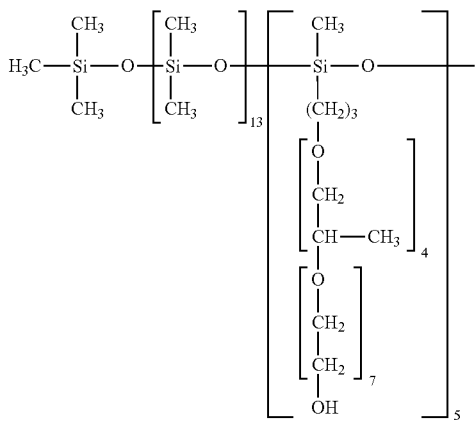

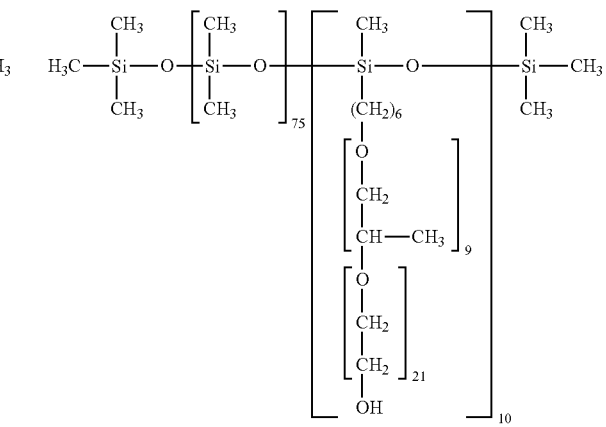

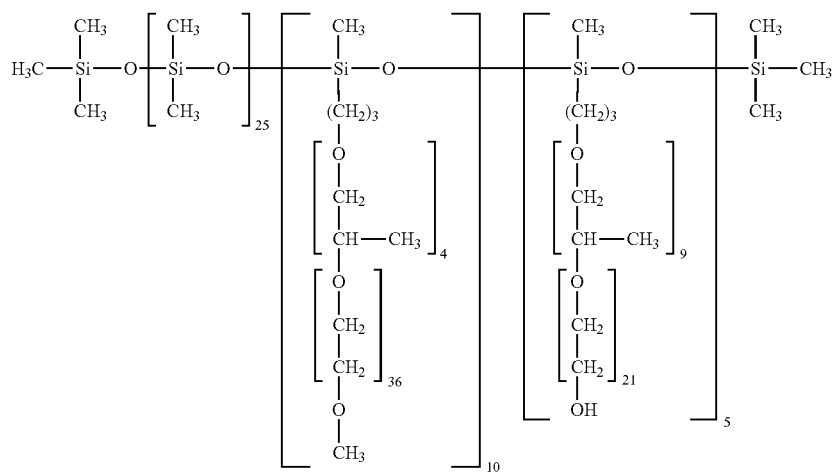
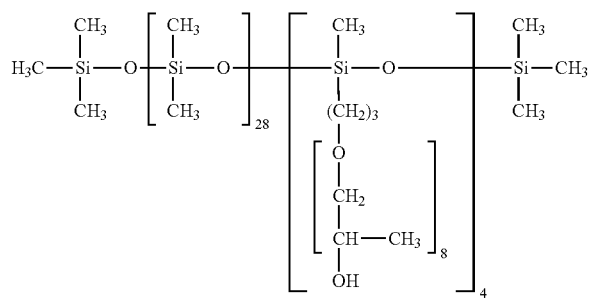
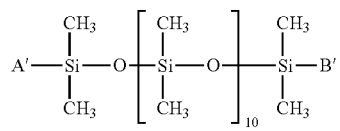
A' = (CH$_2$)$_3$—(OCH$_2$CH$_2$)$_{12}$—(OCH$_2$CHCH$_3$)$_6$—OH
B' = (CH$_2$)$_3$—(OCH$_2$CH$_2$)$_6$—(OCH$_2$CHCH$_3$)$_{14}$—OCH$_3$
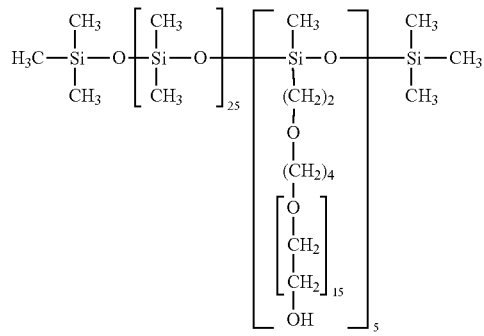
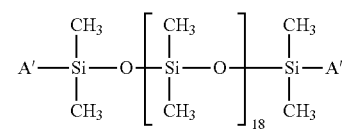
A' = (CH$_2$)$_3$—(OCH$_2$CH$_2$)$_{12}$—(OCH$_2$CHCH$_3$)$_6$—OH
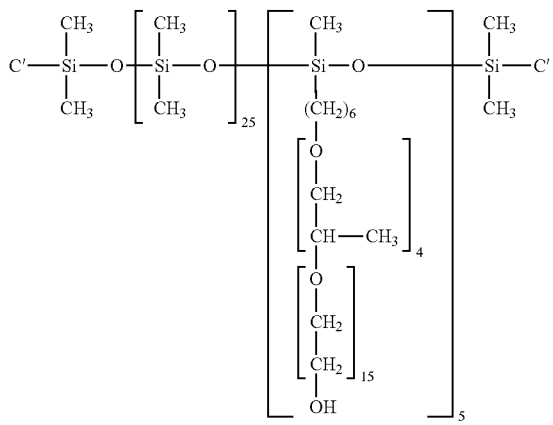
C' = (CH$_2$)$_3$—(OCH$_2$CHCH$_3$)$_4$—(OCH$_2$CH$_2$)$_{15}$—OH
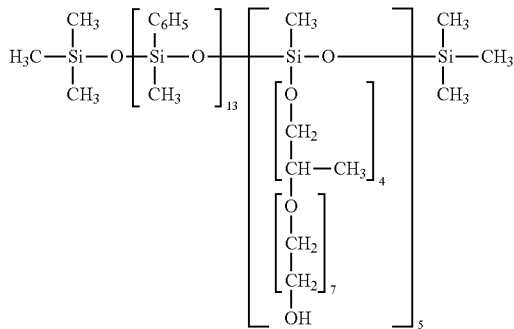

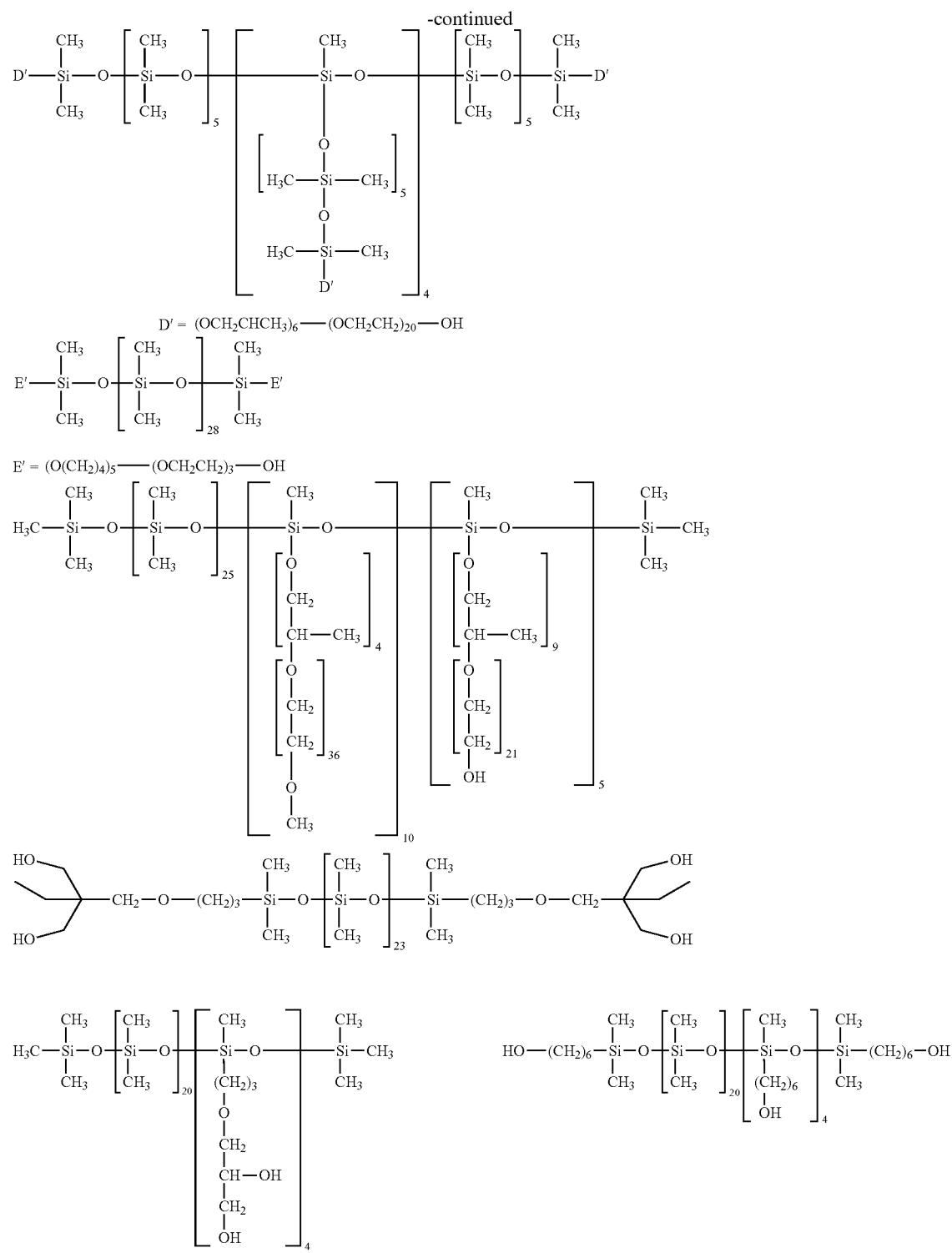

The enzymatic esterification or transesterification of acrylic and/or methacrylic acid or acrylic and/or methacrylic esters with the compounds stated above at low temperatures, in particular 20 to 100° C., preferably 40 to 70° C., under mild conditions, is advantageous in view of the pale colour of the product, the avoidance of formation of by-products, which otherwise may originate, for example, from chemical catalysts, the uncomplicated removal of the enzyme catalyst from the product, and the avoidance of unwanted and uncontrolled free-radical polymerization of the acryloyl and/or methacryloyl compounds.

The acryloyl-functional and/or methacryloyl-functional siloxane derivatives obtainable in this way are notable for the fact that 5% to 100% of all of the hydroxyl groups originally present have undergone conversion to an acrylic and/or methacrylic ester.

The acrylation and/or methacrylation takes place at best in high yields with esters of acrylic and/or methacrylic acid as donor molecules, more particularly methyl, ethyl or butyl methacrylate and/or acrylate.

Enzymes which can be used with preference as catalysts are hydrolases, especially esterases, lipases and proteases. One specific example thereof is Novozym® 435. The enzymes can be used in pure form or in immobilised form on a support, on which they are bound chemically or physically. The amount of the enzyme catalyst is in particular, based on the modified siloxane used, 0.1% to 20% by weight, preferably 1% to 10% by weight. The reaction time is dependent on the amount used and the activity of the enzyme catalyst and is for example up to 48 hours, preferably up to 24 hours.

In order to obtain high degrees of conversion quickly under simple reaction conditions, it is advantageous to use an excess of at least 10% by weight of acrylic and/or methacrylic acid and/or their corresponding esters (as donors) in the reaction mixture.

The production system can be characterized either by a stirred tank reactor or a fixed bed reactor. The stirred tank reactor may be equipped with a device for distilling off the alkanol released from the acrylic and/or methacrylic acid donor or the water released from the acrylic acid and/or methacrylic acid.

The reaction is preferably carried out until the desired conversion is reached. A reaction regime with simultaneous distillation is preferred, since the removal of the water of reaction or alkanol of reaction leads to higher conversions in shorter reaction times, because of the shift in the reaction equilibrium.

To achieve maximum degrees of conversion, it is advisable to remove the water or alkanol of reaction.

After the end of reaction, the enzyme catalyst can be separated off by means of suitable measures, such as filtration or decanting, and may be able to be used a number of times.

The fixed bed reactor is packed with immobilized enzymes, and the reaction mixture is pumped through the catalyst-packed column. With an enzyme immobilized on a support it is also possible to carry out the reaction in a fluidized bed.

The reaction mixture can be pumped continuously through the column, the residence time and hence the desired conversion being controllable via the flow rate. Another possibility is to pump the reaction mixture through the column in circulation, in which case, under reduced pressure if desired, the water or alkanol of reaction can be distilled off at the same time.

Other methods of removing the water or alkanol of reaction can also be used, such as absorption or pervaporation, for example.

In one specific embodiment of the present invention, the organopolysiloxanes are characterized in that they have a polyether excess of 5% to 50% by weight, preferably 5% to 40% by weight, more preferably 10% to 30% by weight and very preferably 10% to 20% by weight. These organopolysiloxanes have particularly beneficial consequences for the rheological properties of the coating materials, and may likewise be prepared by the process described above.

Features of the surface-modified silicon dioxides used in accordance with the invention, in one specific embodiment, include the feature whereby they improve by at least 20% the transmittance of a UV-curing clear coating material, having a refractive index of $n_D20=1.4000$ to $1.5000$ and containing 5% by weight of this modified silicon dioxide, in comparison to an identical UV coating material containing 5% by weight of a reference silicon dioxide treated with a polyethylene wax. The transmittance is improved preferably by at least 25%, more particularly 30%. The reference silicon dioxide treated with polyethylene wax is preferably ACEMATT OK 607, a commercial product of Evonik Degussa, having a specification as per the product information material of 12/02, which is hereby expressly adopted into the content of the description of the present invention. As reference silicon dioxide it is also possible to use silicon dioxides which have the same untreated silicon dioxide and have been coated with a polyethylene wax.

According to the production information material of 12/02, ACEMATT® OK 607 has the following PC data:

TABLE 1

| Features and test methods | Units | ACEMATT® OK 607 |
|---|---|---|
| Loss on drying<br>2 h at 105° C.<br>based on DIN EN ISO 787-2 | % | 6 |
| Loss on ignition[1]<br>2 h at 1000° C.<br>based on DIN EN ISO 3262-1 | % | 13 |
| pH<br>5% strength in water<br>based on DIN EN ISO 787-0 | — | 6 |
| Sulphate content as $SO_4$<br>IR spectroscopy<br>Degussa method | % | 1 |
| Particle size<br>mean value (TEM) | μm | 2 |
| d50 value (laser diffraction) | | 4.5 |
| Surface treatment | | organic |
| Tapped density<br>unsieved<br>based on DIN EN ISO 787-11 | g/l | 115 |
| Density<br>based on DIN EN ISO 787-10 | g/cm$^3$ | 2.0 |
| Oil number<br>based on DIN EN ISO 787-5 | g/100 g | 220 |
| $SiO_2$ content[2]<br>based on DIN EN ISO 3262-19 | % | 98 |

[1]based on dried substance
[2]based on ignited substance

The values reported in Table 1 are average values, which may vary around the natural production fluctuations and error margins of the measurement methods.

To demonstrate the improved transparency it is possible in principle to use any UV coating material having a refractive index within the range stated above, by incorporating in one case a silicon dioxide of the invention and in another case a silicon dioxide coated with PE wax.

The matting agents used in accordance with the invention can be prepared by a process in which a dried silicon dioxide or a suspension of the silicon dioxide or a filter cake is contacted with at least one organopolysiloxane containing at least one multiple bond.

The present invention encompasses, therefore, both wet and dry coating processes.

One preferred process comprises at least one of the following steps:
a) reacting an alkali metal silicate solution with an acidifier, preferably under alkaline to weakly acidic conditions,
b) optionally further adding an acidifier to set a pH of 7 to 2, to give a silicon dioxide suspension,
c) optionally isolating the precipitated solid by filtration, and
d) optionally drying the solid by means of slow drying, e.g. rotary tube dryers or plate dryers, or by means of rapid drying, e.g. spray dryers, spin flash dryers, such that the product has a residual moisture content of less than 10%, e) treating the resulting silicon dioxide with the organopolysiloxane.

In steps a) and b) of this process of the invention the aqueous alkali metal silicate solution used is preferably of sodium silicate (waterglass) with a density of about 1.343 kg/l, with a weight fraction of 27.3% $SiO_2$ and 7.9% $Na_2O$. As acidifier it is possible to use any mineral acid, more particularly concentrated sulphuric acid (96% $H_2SO_4$) or $CO_2$.

In step a)
the silicate solution and the acidifier, as described in DE 31 44 299, for example, may be reacted with one another with stirring. The content of DE 31 44 299 is subject matter of the present invention. Optionally, the acidifier, or the acidifier together with waterglass, can be added to an initial charge of water or sodium silicate. It should preferably be ensured that the precipitation is carried out while a weakly acidic to alkaline pH is maintained. The pH is more particularly 6-12. The precipitation may optionally be carried out at a constant pH or constant alkali number.

In step b)
an acidifier is preferably added, in this case more particularly the acidifier already used for the precipitation, to set a pH in the acidic or neutral range (pH 7 to 2).

In step c)
the silicon dioxide present in the suspension, if desired after a waiting time of 0 to 90 minutes, preferably 15 to 60 minutes, can be isolated by filtration and washed to neutrality with deionized water.

In step d)
the solid is dried preferably by means of rapid drying, e.g. spray dryers, spin flash dryers, or slow drying, e.g. rotary tube dryers or plate dryers, such that the product has a residual moisture content of less than 10%.

The surface modification step e) can be carried out at different points in time in the process described above.

In an embodiment 1)
of the process of the invention, 0.5%-30% by weight of the surface-modifying organopolysiloxane is introduced into the silicon dioxide suspension set to a pH of 7-2 in step b). The addition takes place preferably with a duration of between 1 and 30 minutes, more particularly 5 to 15 minutes, and is preferably carried out at the temperature of the reaction in step a), i.e. more particularly at 50 to 90° C., preferably 50-65° C. Subsequently the surface-modified silicon dioxide is isolated by filtration and dried, as described for steps c) and d).

In an embodiment 2)
of the present invention, the silicon dioxide obtained according to steps a) and b) is isolated by filtration as described for step c), washed if desired with deionised water, then resuspended with water or sulphuric acid or with a mixture of water and sulphuric acid. Subsequently 0.5%-30% by weight of the surface-modifying organopolysiloxane is added to the suspension, and the resulting suspension is sprayed in a spray dryer, and so the surface modification takes place during the drying operation. Also conceivable as well is the simultaneous introduction through nozzles of silicon dioxide suspension and siloxane. Spray drying takes place at 200-500° C., such that the product has a residual moisture content of less than 10%. The solids content of the suspension for spraying can be up to 25% by weight.

In an embodiment 3)
of the process of the invention, the silicon dioxide is prepared and dried as described in steps a)-d). Subsequently the dried silicon dioxide is admixed and intimately mixed with 0.5%-30% by weight of the surface-modifying polymer. The polymer is added over from 0 to 120 min, preferably over from 0 to 60 min, more preferably over from 0 to 30 min. The mixture is mixed further for 0-2 h at 20-150° C. Mixing takes place preferably at 20-100° C., more preferably at 20-80° C. The mixing operation is carried out preferably for 0-1 h and more preferably for 0-30 min.

Optionally, in the case of embodiments 1) and 2), it is also possible to add an emulsifying auxiliary such as LA-S 687 (from TEGO GmbH), for example. This is particularly appropriate in the case of organosilicon compounds which are not water-soluble.

In order to achieve the desired particle distribution it is advisable in embodiments 1 to 3 for the surface-modified silicas, after they have been dried, to undergo grinding, preferably with simultaneous classifying. This grinding can be carried cut in commercial cross-flow mills (e.g. from Alpine or Netzsch-Condux).

In order to avoid oversize or bits it is advantageous, after the surface-modified precipitation silicas have been dried, or after or during the grinding, to separate off particles with a diameter above 50 μm, preferably above 30 μm, more particularly above 20 μm. Depending on the fineness of the matting agent, this may be done, for example, by means of a corresponding sieve or a classifier means, which may also be integrated in the mill.

In addition to the process variants 1 to 3 described above, the present invention also embraces a process in which the surface modification is carried out in the form of a grind coating. This process is distinguished by the simultaneous grinding and surface modification of a silicon dioxide, preferably a precipitated silicon dioxide or a fumed silicon dioxide or a semigel or a silica gel, in a grinding apparatus, preferably a jet mill.

It is preferred for this purpose to use an oval tube mill or a spiral jet mill with static classifying, or, alternatively, an opposed-jet fluid-bed mill or a dense-bed jet mill, very preferably with a dynamic air classifier. It is especially preferred to use a jet mill with integrated classifier, of the kind described in DE 102006048850. The skilled person knows how such a mill can be operated and the coating agent introduced through nozzles.

It has proved to be particularly advantageous if the grinding gas has a pressure of ≤4 bar (abs) and/or a temperature of less than or equal to 180° C., preferably less than 100° C.

The dry coating process has advantages over the above-described wet coating processes especially when using organopolysiloxanes which have a polyether excess of 5% to 50% by weight, preferably 5% to 40% by weight, more preferably 10% to 30% by weight and very preferably 10%-20% by weight. This polyether is largely washed out during the wet coating processes. In the dry coating process, in contrast, the polyether is largely or entirely deposited on the silicon dioxide. As a result, products are obtained that have different properties, where the polyether-containing products of the invention give the coating materials advantageous rheological properties.

As surface-modifying organopolysiloxanes it is possible to use the substances described in more detail above.

In the preparation process of the invention, the organopolysiloxanes are added preferably such that, during the reaction of the organopolysiloxane with the silicon dioxide, the ratio established between organopolysiloxane and silicon dioxide is from 0.5 g:100 g to 30 g:100 g, more particularly from 2 g:100 g to 20 g:100 g, especially 3 g:100 g to 13 g:100 g.

The surface modification may take place as described above before, during or after a grinding or drying operation. The surface modification agent may be added neat, as the pure substance, or in dilute form, as an aqueous emulsion.

The amount and the nature of the organopolysiloxane are in one specific embodiment selected such that the modified silicon dioxide improves by at least 20% the transmittance of a UV clear coating material having a refractive index of $n_D20=1.4000$ to 1.5000 and containing 5% by weight of this modified silicon dioxide, in comparison to an identical coating material containing 5% by weight of a reference silicon dioxide treated with a polyethylene wax.

UV-curing coating materials in the sense of the present invention undergo transition to a solid state following irradiation with UV light, via a chemical reaction, preferably within fractions of a second. This process produces a solid and dry film. Any of the UV coating systems and components of UV coating systems that are known to the skilled person can be used, provided that the organopolysiloxane-modified silicon dioxides described in more detail above are included as matting agents. Examples of literature references in which such compositions may be looked up are as follows:

Petry V. (Apr. 20, 2004): What is the influence of photoinitiators on matting of UV-cured coatings? Fatipec [ed.] (2004)

BASF AG (1999): The heart of coatings—Laromer and Lucirin raw materials for radiation curing Meichsner, G. (2003): Principles of UV curing, in: Meichsner, G. [ed.](2003) Spezielle Technologie UV—lecture script K. P. Schottenloher: Matting of radiation-curing coatings, dissertation at Hochschule Esslingen (2004)

The UV-curing coating materials of the present invention comprise reactive monomers and/or oligomers as binders. Preference is given to acrylates or substituted acrylates or unsaturated polyester resins, and preferred binders used are epoxy, polyester, polyether, oligoether or polyurethane acrylates.

Acrylic polymers which have emerged as being particularly suitable also include copolymers based on acrylate, methacrylate and/or alkyl-substituted derivatives thereof. These acrylic polymers may therefore be, for example, copolymers of acrylate with methacrylate or copolymers of acrylate with alkyl-substituted derivatives of acrylate or methacrylate. Also particularly suitable are copolymers of methyl acrylate with alkyl-substituted derivatives of methacrylate. One particularly suitable copolymer, for example, is a methyl methacrylate-methyl acrylate copolymer (Plex 8671 F, Röhm GmbH). Suitable acrylic polymer for the composition of the invention also includes, of course, mixtures of the aforementioned copolymers.

Besides the binder and the matting agent, the UV coating materials of the invention may comprise auxiliaries such as, for example, photoinitiators, flow control agents, antioxidants, pigments, microcrystalline waxes, organic solvents or water.

Under exposure to light, photoinitiators form free radicals and induce polymerisation. As photoinitiator in the UV-curing coating material of the invention it is preferred to use initiators from the class of the α-hydroxy ketones and their derivatives, preferably hydroxycyclohexyl phenyl ketone. These photoinitiators are available commercially in the form, for example, of Irgacure 184, Irgacure 500, Irgacure 2959 or Darocure 1173 (Ciba Specialty Chemicals, Basle). For the composition of the invention it is also possible, however, to select other known photoinitiators. For example, α-amino ketones, acylphosphine oxides and their respective derivatives are also suitable as such initiators.

The UV-curing composition of the invention may comprise at least one organic solvent, with numerous solvents known typically for such compositions being contemplated as solvents, examples being terpenes, alkanes, aromatics, alcohols, ketones, esters, ethers or mixtures thereof. Preferred solvents are ethanol, butyl acetate, isopropanol, isobutanol, methoxypropanol, methyl ethyl ketone, or mixtures thereof.

The amount of solvent used in the composition may be varied freely within the usual limits and is typically set to take account of the required rheology and film formation in the respective application, and the application-specific air-removal and drying conditions prior to UV curing.

The composition of the invention may also comprise at least one flow control additive, an example being Byk 3510, a polyether-modified polydimethylsiloxane, which can be used preferably with a weight fraction of up to 0.6% to 1.2% by weight.

Additionally, depending on the particular conditions during the coating operation, the UV-curing composition of the invention may comprise at least one defoamer additive. Defoamers are generally ionic or nonionic surfactants and may contribute to improving film formation. One exemplary defoamer is Byk 088, a combination of foam-destroying polymers and polysiloxanes, which for reducing or for preventing disruptive air inclusions in the coating material is used at 0.1% to 0.5% by weight.

The UV coating materials of the invention contain preferably 3% to 30% by weight, preferably 5% to 20% by weight and very preferably 8% to 15% by weight of the organopolysiloxane-modified silicon dioxides.

As already indicated above, the surface-modified silicon dioxides used in the UV coating materials of the invention and described in more detail above may be used for matting different types of coating, such as furniture coatings, decorating coatings, coil coatings, cellulose nitrate coatings, for example.

The physicochemical data of the precipitation silicas of the invention were determined by the following methods:

Determination of the Transmittance of Coating Materials

The transmittance measurement took place using a Specord 200 UV/Vis spectrophotometer from ANALYTIK JENA GmbH in 1 cm quartz cells at room temperature against air as reference. The slot width and step length was 2 nm.

For this purpose a UV coating material having a refractive index $n_D20=1.4000$ to 1.5000 was introduced, and 2.5 g of the respective matting agent (surface-modified silicon dioxide) were incorporated. In this case the matting agent is dispersed at room temperature, using a paddle stirrer for 10 minutes at 2000 revolutions/minute, into 50 g of the UV coating material. Dispersion took place in a 180 ml PE mixing beaker at room temperature. The paddle diameters of the stirrer are 43 mm. Subsequently the freshly prepared dispersion is placed in 1 cm quartz cells, and UV/Vis spectra are recorded in transmission between 190 and 1100 nm.

DBP Absorption

The DBP absorption (DBP number), which is a measure of the absorbency of the silicon dioxide, is determined as follows in a method based on the standard DIN 53601:

Procedure 12.50 g of silicon dioxide in powder or bead form with a moisture content of 0-10% (the moisture content is adjusted where appropriate by drying at 105° C. in a drying cabinet) are introduced into the kneader chamber (article number 279 061) of the Brabender Absorptometer "E". In the case of granules the sieve fraction from 3.15 to 1 mm (stainless steel sieves from Retsch) is used (by gentle pressing of the granules through the 3.15-mm-pore-size sieve using a plastic spatula). With continual mixing (peripheral speed of the blades of the kneader: 125 rpm) dibutyl phthalate is added dropwise to the mixture at a rate of 4 ml/min at room temperature, by means of the Brabender T 90/50 Dosimat. Its incorporation by mixing requires only a small amount of force, and is monitored by means of the digital display. Towards the end of the determination the mixture becomes pasty, as indicated by a sharp increase in the required force. At a display reading of 600 digits (torque of 0.6 Nm) an electrical contact shuts off both the kneader and the DBP feed. The synchronous motor for the DBP feed is coupled to a digital counter, and so the consumption of DBP in ml can be read off.

Evaluation

The DBP absorption is reported in g/100 g and is calculated using the following formula from the DBP consumption measured. The density of DBP at 20° C. is typically 1.047 g/ml.

DBP absorption in g/100 g=consumption of DBP in ml*density of DBP in g/ml*100/12.5 g The DBP absorption is defined for the anhydrous, dried silicon dioxide. When moist silicon dioxides are used the figure must be corrected by means of the correction table below.

The correction value corresponding to the water content is added to the experimental DBP value; for example, a water content of 5.8% would mean an addition of 33 g/100 g for the DBP absorption.

TABLE 2

Correction table for dibutyl phthalate absorption - anhydrous -

| | . % Water | | | | |
|---|---|---|---|---|---|
| % Water | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Moisture Content of Silicon Dioxides

According to this method and working on the lines of ISO 787-2 the volatile fractions (called "moisture content" for simplicity below) of silicon dioxides are determined after 2 hours' drying at 105° C. This loss on drying generally consists predominantly of water moisture.

Procedure 10 g of the silicon dioxide in powder, bead or granule form are weighed out to an accuracy of 0.1 mg (initial mass E) into a dry glass weighing boat with ground-glass lid (diameter 8 cm, height 3 cm). With the lid open, the sample is dried in a drying cabinet at 105±2° C. for 2 h. Thereafter the weighing boat is sealed and cooled to room temperature in a desiccator cabinet with silica gel as siccative. The final mass A is determined gravimetrically. The moisture content in % is determined as (E in g−A in g)*100%/E in g.

The measurement is carried out in duplicate.

Determination of the Loss on Ignition:

2 h at 1000° C. after drying, DIN 55 921/3.4, ISO 3262

Determination of the d50

Aggregate size distribution by laser diffraction (Coulter)

Apparatus:

Laser diffraction instrument LS 230, Coulter

Bandelin ultrasound rod, type HD 2200, with DH 13 G horn

Cooling bath 80 ml

Eppendorf pipette 5 ml

Centrifuge glass, height 7 cm, Ø 3 cm

Petri dish, height 4 cm, Ø 7 cm

Dewar vessel, height 21 cm, Ø 4 cm

Digital thermometer, accuracy±0.1 K

Chemicals:

Ethanol, p.a., Merck

Triton X-100, Merck

Sodium hexametaphosphate, Baker

Sample Preparation:

Granules are placed in a mortar and the coarse granule pieces are crushed, not mortared.

1 g of unaged silicon dioxide (produced not more than 10 days earlier) is weighed out into a 30 ml glass vessel with a rolled edge, and 20 ml of dispersion solution (20 g of sodium hexametaphosphate made up to 1000 ml with demineralized water) are added. The sample is subsequently placed in a cooling bath, which prevents the suspension heating up significantly, and is treated with ultrasound for 1 min (20 W power, 80% pulses). Three dispersion solution specimens are prepared in succession for each silica.

Until the sample is introduced into the liquid module, the suspension is placed in a Petri dish with magnetic stirrer in order to prevent any sedimentation.

Procedure:

Prior to the beginning of the measurement the instrument and the liquid module are warmed up for at least 30 minutes and the module is rinsed automatically for 10 minutes (menu bar "Control/Rinse").

In the control bar of the Coulter software the file window "calculate Opt. Model" is selected via the menu item "Measurements" and the refractive indices are defined (liquid refractive index real=1.332; material refractive index real=1.46, imaginary=0.1).

In the file window "Measurement cycle" the level of the pump speed is set at 26% and the ultrasound power at 3%. The ultrasound items to be activated are "during sample addition", "before each measurement", and "during measurement".

Additionally in this file window the following items are selected:

Offset measurement (1× daily)

Adjustment

Background measurement

Set measurement concentration

Enter sample info

Enter measuring info

Start 2 measurements

Automatic rinsing

With PIDS data

When calibration is over the samples are added. Dispersed silica is added until light absorption of about 45% is reached and the instrument reports OK.

The measurement is made with the Fraunhofer model, using the standard software of the laser diffraction instrument LS 230 from Coulter.

Three duplicate determinations of 60 seconds are carried out on each sample added.

From the raw data plot the software calculates the particle size distribution on the basis of the volume distribution.

Determination of the C Content

Apparatus:
  C-mat 500 from Ströhlein Instruments
  Analytical balance
  Porcelain boat with lid
  Tweezers
  Metering spoon Reagents:
  Euro analysis control sample 077-2 (Ströhlein Instruments)
  Oxygen Procedure Measurement of the Control Sample Measurement is carried out first on the control sample. For this purpose 0.14-0.18 g of sample is weighed out onto a fully baked and cooled porcelain boat on an analytical balance. When the start key is actuated the weight is carried over, since the balance is coupled with the C-mat. The boat must be pushed into the middle of the combustion tube within 30 seconds. When combustion is over the figure measured is converted into pulses and evaluated by the computer. Two or more determinations are carried out. If necessary the factor of the instrument must be set anew. The factor is calculated in accordance with the following formula:

$$\text{factor} = \frac{\text{target value} * \text{initial mass} * 100}{\text{pulses}}$$

Measurement of the Silicon Dioxide Samples

After the factor has been determined, the silicon dioxide samples are measured. For this purpose 0.04-0.05 g of each silica is weighed out into a porcelain boat and the boat is covered with a porcelain lid. Subsequently the silica samples are subjected to measurement in the same way as for the control sample. In the case of deviations >0.005% a third measurement and, if necessary, further measurements is/are carried out and the average is calculated.

Evaluation

The carbon content is calculated in accordance with the following formula:

$$\% C = \frac{P * F * 10^{-5}}{E * 1000}$$

where:
  P=pulses
  F=factor
  E=initial mass in g

Reporting of Result

The result is given in % C to 2 decimal places.

Remarks

The C-mat 500 can be handled in accordance with the operating instructions from Ströhlein Instruments.

Determination of Reflectometer Values

1. Principles

The influence exerted on reflection capacity by deliberate roughening of coating film surfaces is the outstanding property of matting silicas. The reflectometer value is therefore an important criterion in characterizing matted coating films.

2. Method

This method gives direct information about the reflection capacity and therefore about the gloss characteristics of the coating film surfaces, and also indirect information on the degree of roughening thereof.

3. Apparatus

Reflectometer with DIN 67530 measurement geometry, tested to DIN 67530 (e.g. Haze-gloss, BYK Instruments).

4. Procedure

A prerequisite for measurement is that the coating film surfaces for measurement should be level, clean and fully cured.

The measurement is to be carried out on at least 3 representative locations on the sample. If the deviations between the individual measurements are too great, then generally a further measurement should be carried out on representative locations, or the number of individual measurements should be increased to >3. The standard deviation of the measurements is shown in the display on the BYK haze-gloss. If the standard deviation s is >0.5, it is advisable to carry out the measures referred to above.

The average value should be reported to 1 decimal place.

5. Remarks Concerning the Measurement Geometry

In the characterization of matted coating film surfaces, an established procedure is to carry out measurement with the 60° and 85° measurement geometries. In deviation from DIN 67530, therefore, the reflectometer values of matted coating film surfaces are determined with both measurement geometries.

By determining the so-called sheen (i.e., 85° reflectometer value minus 60° reflectometer value) it is possible to obtain important information about the particle distribution on the matting agent present in the coating film.

In order to be able to make a meaningful determination of the sheen, the 60° reflectometer values of the samples for comparison where appropriate ought to have deviations of not more than +1.5 reflectometer values.

Determination of Rheological Properties

1. Principles

Matting agents based on silicon dioxides modify the rheological properties of coating materials. These changes may be manifested in the development of non-Newtonian flow behaviour, such as yield points, structural viscosity effects and thixotropic effects. Generally speaking, these effects can be measured with a rotational viscometer mounted on ball bearings. Where the precision of the ball-bearing-mounted rotational viscometer is insufficient, measurements can be carried out with an air-mounted rotational or oscillatory viscometer.

2. Apparatus
  RheolabQC
  Measuring cylinder CC 27
  Measuring cylinder CC 39
  Disposable measuring beaker
  Control and evaluation computer

3. Operating Instructions

3.1 Measuring System

The coaxial cylinder measuring system is composed of measuring element, disposable measuring beaker, and measuring-beaker holder.

2 different measuring elements are available.

| Measuring cylinder (rotating body) | Viscosity range | Filling quantity |
|---|---|---|
| CC 27 | Moderate to high viscosity coatings | 17 ml |
| CC 39 | Low to moderate viscosity coatings | 65 ml |

3.2 Preparation for Measurement

Switch on thermostat; the measuring temperature is 23° C. Switch on the cooling for the thermostat. Switch on RheolabQC; the internal check on the Rheolab is carried out. Commence "RHEOPLUS" rheology software on the connected PC. Couple measuring elements into the RheolabQC. Carry out self diagnosis of the connection between PC and Rheolab QC via "measuring instrument" "start diagnosis". If the condition is in order, the "tool master" of the Rheolab QC automatically recognizes the measuring element used, displays it in the display of the Rheolab QC, and passes the recorded measuring-system data to the measuring software. Introduce the required sample quantity into a corresponding disposable measuring beaker, without bubbles, in accordance with the measuring element used. Insert the disposable measuring beaker (with cover) into the holder, and screw down using the union nut. The instrument is ready for measurement, Which is carried out according to the operating instructions of the instrument.

Measurement of Transparency/Density

When matting agents are used in transparent coating materials, a more or less pronounced haze may become apparent, depending on the matting agent used and the binder system, and gives the transparent coating film a bluish undertone. As a result, this effect is also known as blue haze. The analytical test data of the matting agents do not provide any information on this effect. Using a densitometer or a colorimeter, this effect can be metrically detected reproducibly on appropriately prepared matt coatings.

Through the application of coating films to black glass sheets, the depth of colour of the black glass sheet is attenuated in accordance with the level of haze. Via a measurement of the density, i.e. depth of colour, through the coating film, information can be gained indirectly about the level of haze.

1. Apparatus

Gretag Macbeth SpectroEye colorimeter

2. Operating Instructions

2.1 Calibration

The instrument possess a routine for self-calibration. This takes place immediately after the instrument is switched on.

2.2 Basic Settings

In the main menu > settings > user related > standard measurement > measuring conditions, the following settings should be selected:

| Parameter | Setting |
|---|---|
| Physical filter | No |
| White reference | Abs |
| Illuminant | D65 |
| Observation angle | 10° |
| Density standard | DIN |

In the measuring window > measuring function, select the function "density".

In the measuring window > absolute/difference, switch the function to "absolute".

In the measuring window > graphic/numeric, switch the function to "numeric".

In the measuring window > density filter, select the "yellow" filter.

In the display, Dy appears, for "density measurement with yellow filter".

In the measuring window > averaging, the automatic formation of averages can be set, with pre-selection of the number of values.

In the measuring window > density filter, select the yellow filter.

2.3 Measurement

Set the instrument in the measuring window with the rotary wheel to "sample". By pressing the measuring button, the measurement is commenced. At least 5 measurements are carried out. It should be ensured that the measurement locations do not have any defects, such as craters, inclusions, scratches, air bubbles, etc. The greatest allowable deviation between the lowest and highest values is D=0.05. An average (unless activated automatically) must be formed from the measurement data ascertained.

The examples which follow serve to illustrate the invention and are not intended to restrict the scope of its protection as set out in the claims of the patent.

Inventive Example 1

In an AFG 200 Aeroplex opposed-jet fluid-bed mill from Hosokawa Alpine AG, the precipitated silica ACEMATT® HK400 from Evonik Degussa GmbH was ground at a grinding-air entry temperature of 76° C. (internal grinding chamber temperature 60° C.) and a pressure of 0.4 bar (abs), and coated with the silicone polyether acrylate Tego® Rad 2300 from Evonik Goldschmidt GmbH. The coating agent is introduced into the mill via a two-fluid nozzle which is located in the same plane as the grinding nozzles (3 grinding nozzles at a spacing of 120°, and between two of these grinding nozzles the two-fluid nozzle, at a spacing of 60°). The amount of silicone polyether acrylate is calculated so as to give a carbon content, based on the total weight of the end product, of 3.2% by weight. The product has a $d_{50}$ value of 4.7 μm.

Comparative Example 1

Corresponding to Example 1 of DE 102004029069, i.e. a matting agent silica coated with a polyorganosiloxane without multiple bond.

Comparative Example 2

This is the commercially available product Gasil UV 70 C from PQ Corporation, a matting agent developed and sold especially for UV coating materials.

Example 2

A UV coating material matted with the matting agents identified above was prepared as follows:

Formula

| Item | Raw material | Purity | Manufacturer | Amount |
|---|---|---|---|---|
| 1 | Laromer LR 8889 | as-supplied form | BASF | 77.70 |
| 2 | HDDA | as-supplied form | BASF | 19.40 |
| 3 | Irgacure 184 | as-supplied form | Ciba | 2.50 |
| 4 | Irgacure 819 | as-supplied form | Ciba | 0.40 |
|  | Total |  |  | 100.00 |

The individual raw materials are gradually weighed out in the above sequence, and homogenized using a laboratory dissolver. Homogenisation must take place in each case after items 3 and 4. After item 4, the base clear coat is stirred until all of the solid components have fully dissolved.

Preparation of the Matted Clear Coating Material:

Prior to use, the glossy base coating material is homogenized with a paddle stirrer at 2000 rpm. In 100 parts by weight of this base coating material, the matting agents under investigation are tested against the corresponding standard specimens a) with the same initial mass (in order to illustrate differences in the reflectometer values of the applied matting coating material),
b) with different initial masses (in order to obtain the same reflectometer value at 15 μm dry film thickness), and
c) with different initial masses (in order to determine the achievable reflectometer values for a given viscosity).

Following careful incorporation using a spatula, the matting agent is dispersed with a paddle stirrer at 2000 rpm for 10 minutes in a 350 ml PE beaker.

Processing and Testing of the Matt Coating Material Produced:

After the matting agents have been dispersed, application takes place with wire-wound applicators in sizes of 20 μm, 40 μm, 60 μm and 80 μm to BYK test cards 2854. Determination should always be carried out in duplicate. Following application, the coating films are cured in a UV unit from IST Metz GmbH. It must be ensured that the Hg lamp is selected with an output of 100%, and the belt speed is 2 m/min. The reflectometer value and the density can be determined immediately, while the viscosity of the liquid coating material is not determined until the next day, using the Rheolab QC.

The results of the investigations are given in Tables 3 and 4 below:

TABLE 3

Test of the gloss properties of the UV coating materials

Application by wire-wound applicator to Byk test cards 2854

| UV drying 1 × 2 m/min, Hg lamp 200 W/cm | | 20 μm Reflectometer value | | | 40 μm Reflectometer value | | | 60 μm Reflectometer value | | | 80 μm Reflectometer value | | |
|---|---|---|---|---|---|---|---|---|---|---|---|---|---|
| Dispersing: 10 min paddle stirrer, Ø 45 mm, 2000 rpm PE beaker 350 ml | | 60° | 85° | Δ 85° – 60° | 60° | 85° | Δ 85° – 60° | 60° | 85° | Δ 85° – 60° | 60° | 85° | Δ 85° – 60° |
| Inventive Example 1 | 13.0 g | 13.4 | 67.3 | 53.9 | 10.4 | 60.2 | 49.8 | 9.4 | 57.6 | 48.2 | 9.1 | 57.7 | 48.6 |
| Comparative Example 1 | 15.0 g | 15.5 | 70.8 | 55.3 | 12.3 | 65.1 | 52.8 | 10.0 | 60.7 | 50.7 | 8.9 | 57.4 | 48.5 |
| Comparative Example 2 | 13.0 g | 18.6 | 67.2 | 48.6 | 17.3 | 66.4 | 49.1 | 14.9 | 63.4 | 48.5 | 12.7 | 59.4 | 46.7 |
| Density/Transparency | | | | | | | | | | | | | |
| Inventive Example 1 | | | | | | | | | | | | 1.62 | |
| Comparative Example 2 | | | | | | | | | | | | 1.57 | |
| Comparative Example 1 | | | | | | | | | | | | 1.58 | |

As is evident from Table 3, the product according to the invention shows significantly better matting properties, especially at thin film thicknesses. Moreover, it shows a greater transparency when used at the same initial mass as the comparative examples.

TABLE 4

Test of the rheological properties of the UV coating materials

| Rheolab QC | Conc. MM g/ 100 g coating | D = 1 | D = 10 | D = 25 | D = 100 | D = 250 | D = 1000 |
|---|---|---|---|---|---|---|---|
| Inventive Example 1 | 13.0 g | 1420 | 419 | 328 | 277 | 260 | 245 |
| Comparative Example 1 | 15.0 g | 1820 | 805 | 701 | 613 | 570 | 483 |
| Comparative Example 2 | 13.0 g | 8260 | 1040 | 541 | 280 | 218 | 180 |

From Table 4 it is clear that the product according to the invention exhibits significant advantages in rheology and has a much lower structural viscosity. This is a major advantage in the context of the processing of such coating materials in industrial processing operations.

The invention claimed is:

1. A UV coating material, comprising:
   a surface-modified silicon dioxide particle,
   wherein at least a part of the silicon dioxide particle is coated with an organopolysiloxane which is a polyoxyalkylene-modified siloxane derivative of the formula (I)

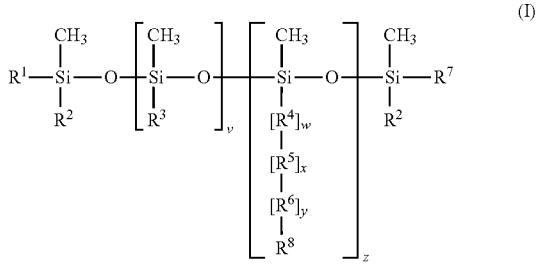

wherein
$R^1$ and/or $R^7 = R^2$ or $[R^4]_w-[R^5]_x-[R^6]_y-R^8$,
$R^2 = R^3$ or $\neq R^3$ stands for identical or different alkyl radicals or alkylene radicals having 1 to 24 carbon atoms or optionally substituted phenyl radicals having up to 24 carbon atoms,
$R^4 =$ a divalent radical of the formula O, NH, $NR^2$, S or a radical of the formula $(OSi(CH_3)_2)_u$, where
u=1 to 200,
$R^5 =$ identical or different alkyl radicals or alkylene radicals having 1 to 24 carbon atoms, or
$C_nH_{2n-f}R^2_f-R^4-C_mH_{2m-g}R^2_g$, where
f=0 to 12,
g=0 to 12,
n=1 to 18,
m=1 to 18,
$R^6 = O-(C_2H_{4-a}R^2_aO)_b(C_cH_{2c}O)_d$, where
a=0 to 3,
b=0 to 100,
c=2 to 12,
d=0 to 100,
the sum (b+d)=1 to 200,
and the sequence of the individual polyoxyalkylene segments $(C_2H_{4-a}R^2_aO)_b$ and $(C_cH_{2c}O)_d$ is arbitrary,
or
$R^6 = O_e-C_hH_{2h}-C_iH_{2i-j}R^9_j$, where
e=0,
h=0 to 24,
i=0 to 24,
j=1 to 3,
and $R^9$ in each case is a divalent radical of the formula O, a hydroxyl group, a radical of the formula $C_{h1}H_{2h}$ or a radical of the formula $C_kH_{2k-l}(OH)_l$, where
k=0 to 24 and
l=1 to 3,
$R^8 =$ a hydrogen radical or a monovalent organic radical, if y is 1, it being necessary for there to be at least one hydrogen radical per molecule, or is an OH group or a monovalent organic radical, with y=0, there being at least one OH group per molecule,
v=0 to 200,
w=1,
x=1,
y=0 or 1,
z=1 to 200,
and the sum (w+x+y)=2 or 3.

2. The UV coating material of claim 1, wherein the silicon dioxide particle is a precipitated silica, a fumed silica, a semigel, or a silica gel.

3. The UV coating material of claim 1,
wherein the surface-modified silicon dioxide particle has a $d_{50}$ of from 1 to 50 μm, a DBP of from 100 to 600 g/100 g, a C content of from 1% to 20% by weight, or a combination thereof.

4. The UV coating material of claim 1,
wherein the UV coating material has a refractive index of $n_D 20 = 1.4000$ to 1.5000,
the UV coating material comprises 5% by weight of the surface-modified silicon dioxide particle, and
a transmittance of the UV coating material is at least 20% improved over an otherwise identical coating material comprising 5% by weight of a reference silicon dioxide treated with a polyethylene wax and not with the surface-modified silicon dioxide particle.

5. The UV coating material of claim 1, wherein the organopolysiloxane has a polyether excess of from 5% to 50% by weight.

6. The UV coating material of claim 1, wherein the UV coating material is a clear coating material or a pigmented coating material.

7. The UV coating material of claim 1, further comprising:
a binder based on a reactive monomer, based on a reactive oligomer, or based on both.

8. The UV coating material of claim 1, comprising:
from 3% to 30% by weight of the organopolysiloxane-modified silicon dioxide particle; of at least one component selected from the group consisting of a photoinitiator, a flow control agent, an antioxidant, a pigment, a microcrystalline wax, an organic solvent, and water; or of both the organopolysiloxane-modified silicon dioxide particle and the at least one component.

9. A process for preparing the UV coating material of claim 1, the process comprising:
contacting a dried silicon dioxide, a suspension of silicon dioxide, or a filter cake with at least one organopolysiloxane comprising a multiple bond.

10. The process of claim 9, comprising:
reacting an alkali metal silicate solution with an acidifier, further adding an acidifier to set a pH of from 7 to 2, to obtain a silicon dioxide suspension,
isolating precipitated solid from the silicon dioxide suspension by filtration, and
drying the solid by slow drying or rapid drying to obtain a dried silicon dioxide, such that the dried silicon dioxide has a residual moisture content of less than 10%,
treating the dried silicon dioxide with an organopolysiloxane comprising a multiple bond,
or a combination thereof.

11. The process of claim 9, wherein a content of the organopolysiloxane is from 0.5% to 30% by weight, and -the organopolysiloxane comprises a carbon-carbon double bond, a carbon-carbon triple bond, or both.

12. The process of claim 10, further comprising: resuspending the precipitated solid isolated by filtration with water, sulphuric acid, or a mixture of water and sulphuric acid, then
adding to the suspension a surface-modifying organopolysiloxane comprising a carbon-carbon double bond, a carbon-carbon triple bond, or both, and
drying the resulting suspension.

13. The process of claim 10, further comprising:
admixing and intimately mixing the dried silicon dioxide with a surface-modifying organopolysiloxane comprising a carbon-carbon double bond, a carbon-carbon triple bond, or both.

14. The process of claim 13, further comprising:
further mixing the dried silicon dioxide and the organopolysiloxane for 0-2 h, heat treating the dried silicon dioxide and the organopolysiloxane at from 20 to 150° C.,
or both.

15. The process of claim 9, further comprising:
grinding surface-modified silicon dioxide, separating off dried silicon dioxide particles having a diameter of more than 50 μm, or both.

16. The process of claim 9, further comprising:
simultaneously grinding and surface-modifying, in a milling apparatus, a silicon dioxide, a semigel, or a silica gel.

17. The process of claim 16, wherein the milling apparatus employs a milling gas with a pressure of ≤4 bar (abs), a temperature of less than or equal to 180° C., or both.

* * * * *